(12) United States Patent
Feshali et al.

(10) Patent No.: US 10,641,957 B2
(45) Date of Patent: May 5, 2020

(54) SMOOTH WAVEGUIDE STRUCTURES AND MANUFACTURING METHODS

(71) Applicant: Juniper Networks, Inc., Sunnyvale, CA (US)

(72) Inventors: Avi Feshali, Sunnyvale, CA (US); John Hutchinson, Santa Barbara, CA (US); Jared Bauters, Santa Barbara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/689,296

(22) Filed: Aug. 29, 2017

(65) Prior Publication Data
US 2019/0064439 A1 Feb. 28, 2019

(51) Int. Cl.
| | |
|---|---|
| *G02B 6/136* | (2006.01) |
| *G02B 6/122* | (2006.01) |
| *G02B 6/132* | (2006.01) |
| *G02B 6/32* | (2006.01) |

(Continued)

(52) U.S. Cl.
CPC .......... *G02B 6/136* (2013.01); *G02B 6/122* (2013.01); *G02B 6/1228* (2013.01); *G02B 6/43* (2013.01); *G02B 6/12002* (2013.01); *G02B 6/12004* (2013.01); *G02B 6/132* (2013.01); *G02B 2006/12061* (2013.01); *G02B 2006/12097* (2013.01)

(58) Field of Classification Search
CPC ...... G02B 6/136; G02B 6/1228; G02B 6/122; G02B 6/43; G02B 6/132; G02B 6/12002; G02B 6/12004; G02B 2006/12061; G02B 2006/12002; G02B 2006/12004; G02B 2006/12097; G02B 2006/12176; G02B 2006/12152
See application file for complete search history.

(56) References Cited

U.S. PATENT DOCUMENTS 8,884,298 B2 * 11/2014 Maeda ................. H01L 29/045
257/66
2012/0138568 A1 6/2012 Na

FOREIGN PATENT DOCUMENTS

| CN | 101199042 | 6/2008 |
| CN | 103487883 | 1/2014 |
| CN | 103901535 | 7/2014 |

(Continued)

OTHER PUBLICATIONS

"European Application Serial No. 18188999.9, Extended European Search Report dated Jan. 31, 2019", 13 pgs.

(Continued)

*Primary Examiner* — Ryan A Lepisto
*Assistant Examiner* — Erin D Chiem
(74) *Attorney, Agent, or Firm* — Schwegman Lundberg & Woessner, P.A.

(57) ABSTRACT

In integrated optical structures (e.g., silicon-to-silicon-nitride mode converters) implemented in semiconductor-on-insulator substrates, wire waveguides whose sidewalls substantially consist of portions coinciding with crystallographic planes and do not extend laterally beyond the top surface of the wire waveguide may provide benefits in performance and/or manufacturing needs. Such wire waveguides may be manufactured, e.g., using a dry-etch of the semiconductor device layer down to the insulator layer to form a wire waveguide with exposed sidewalls, followed by a smoothing crystallographic wet etch.

13 Claims, 19 Drawing Sheets

(51) Int. Cl.
    *G02B 6/43*    (2006.01)
    *G02B 6/12*    (2006.01)

(56) References Cited

FOREIGN PATENT DOCUMENTS

| CN | 109425931 A | 3/2019 |
|---|---|---|
| EP | 2801849 | 11/2014 |
| WO | WO-2004008203 A1 | 1/2004 |
| WO | WO-2007002426 A2 | 1/2007 |

OTHER PUBLICATIONS

Bargiel, S, et al., "Towards micro-assembly of hybrid MOEMS components on a reconfigurable silicon free-space micro-optical bench", Journal of Micromechanics & Microengineering, vol. 20, No. 4, 1317 (Mar. 15, 2010), 045012.

Sacher, Wesley D, et al., "Multilayer Silicon Nitride-on-Silicon Integrated Photonic Platforms and Devices", Journal of Lightwave Technology, vol. 33, No. 4, (Feb. 15, 2015), 901-910.

"European Application Serial No. 18188999.9, Response filed Sep. 6, 2019 to Extended European Search Report dated Jan. 31, 2019", 14 pgs.

"Chinese Application Serial No. 201810922621.3, Office Action dated Jan. 20, 2020", W English Translation, 19 pgs.

\* cited by examiner

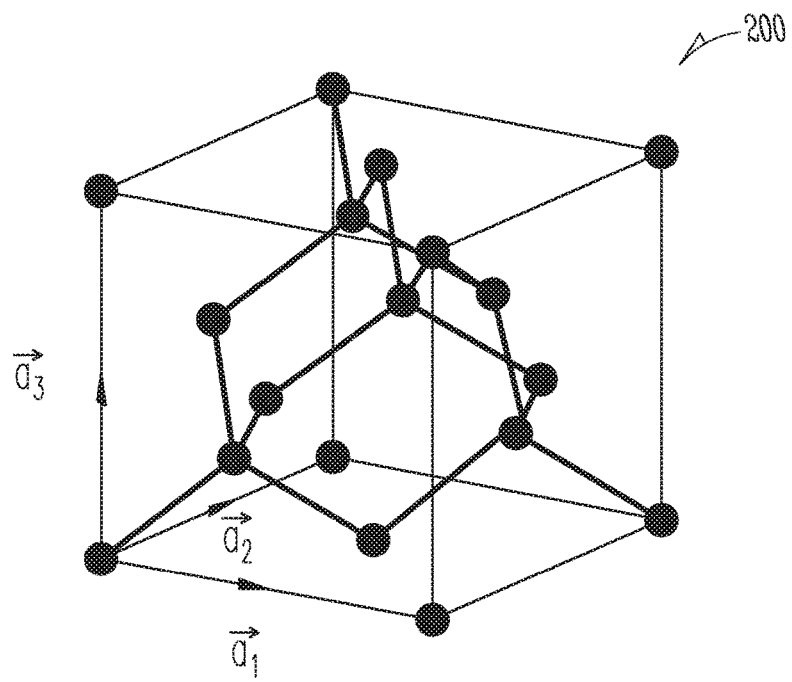
Fig.2A
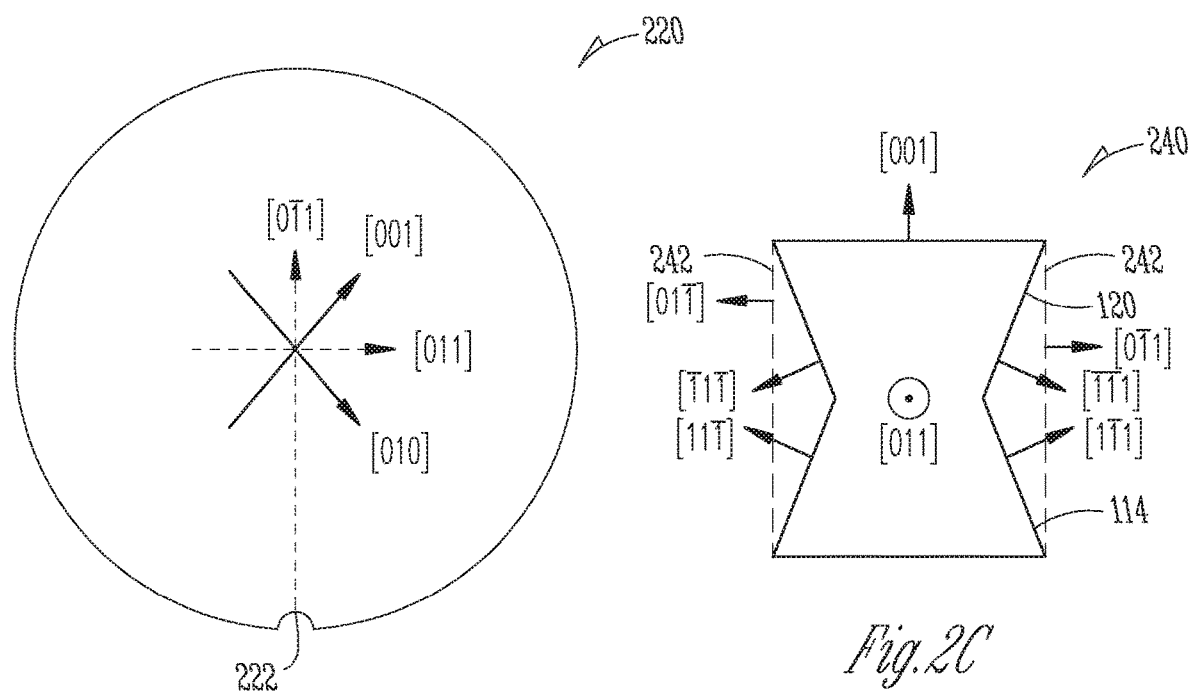
Fig.2B
Fig.2C

SECTION B-B

SECTION C-C

SECTION D-D

SECTION E-E

SECTION F-F

SECTION G-G

SECTION H-H

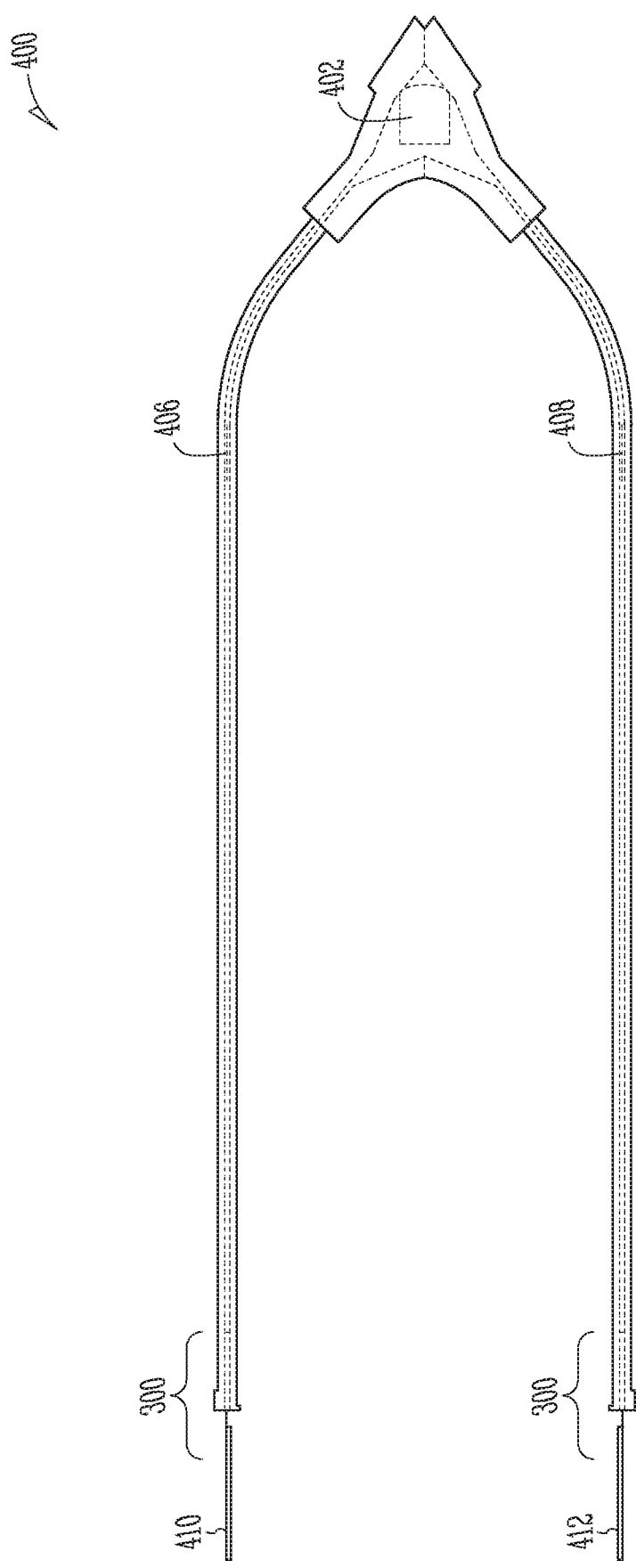

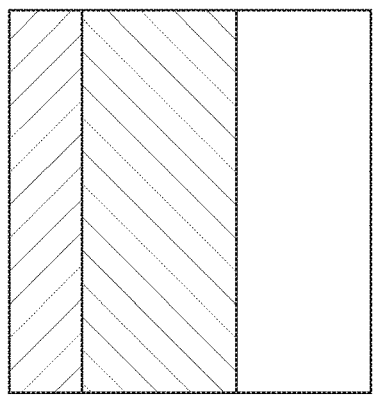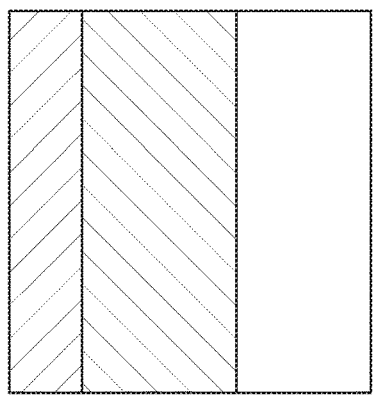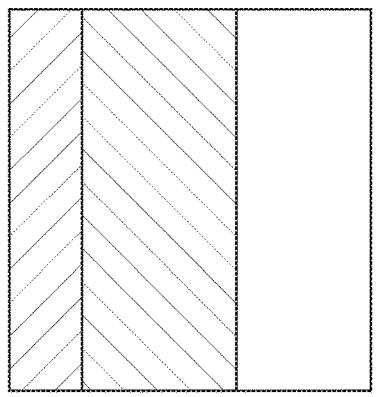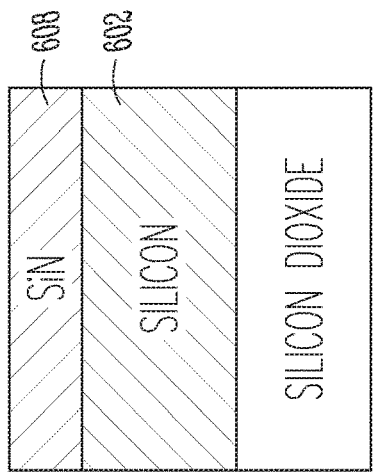
Fig. 6B

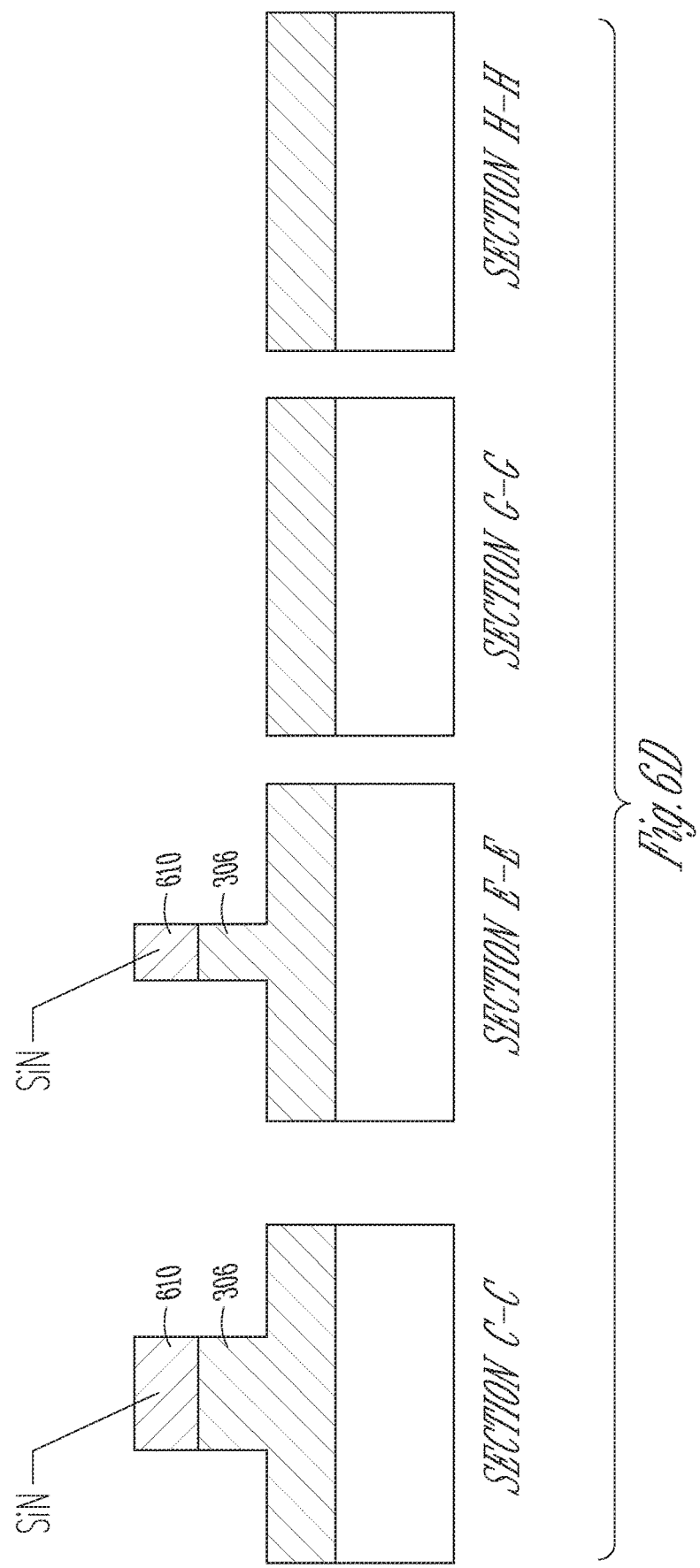

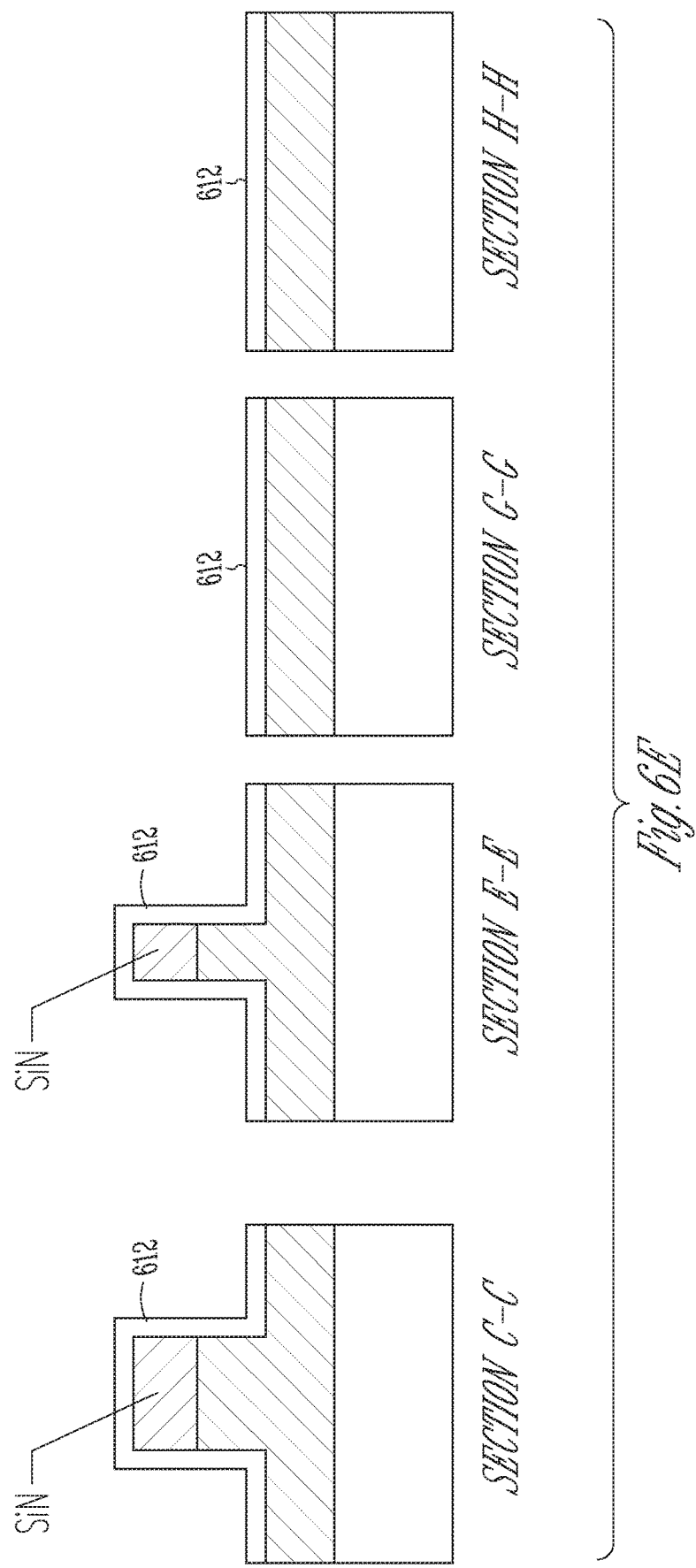

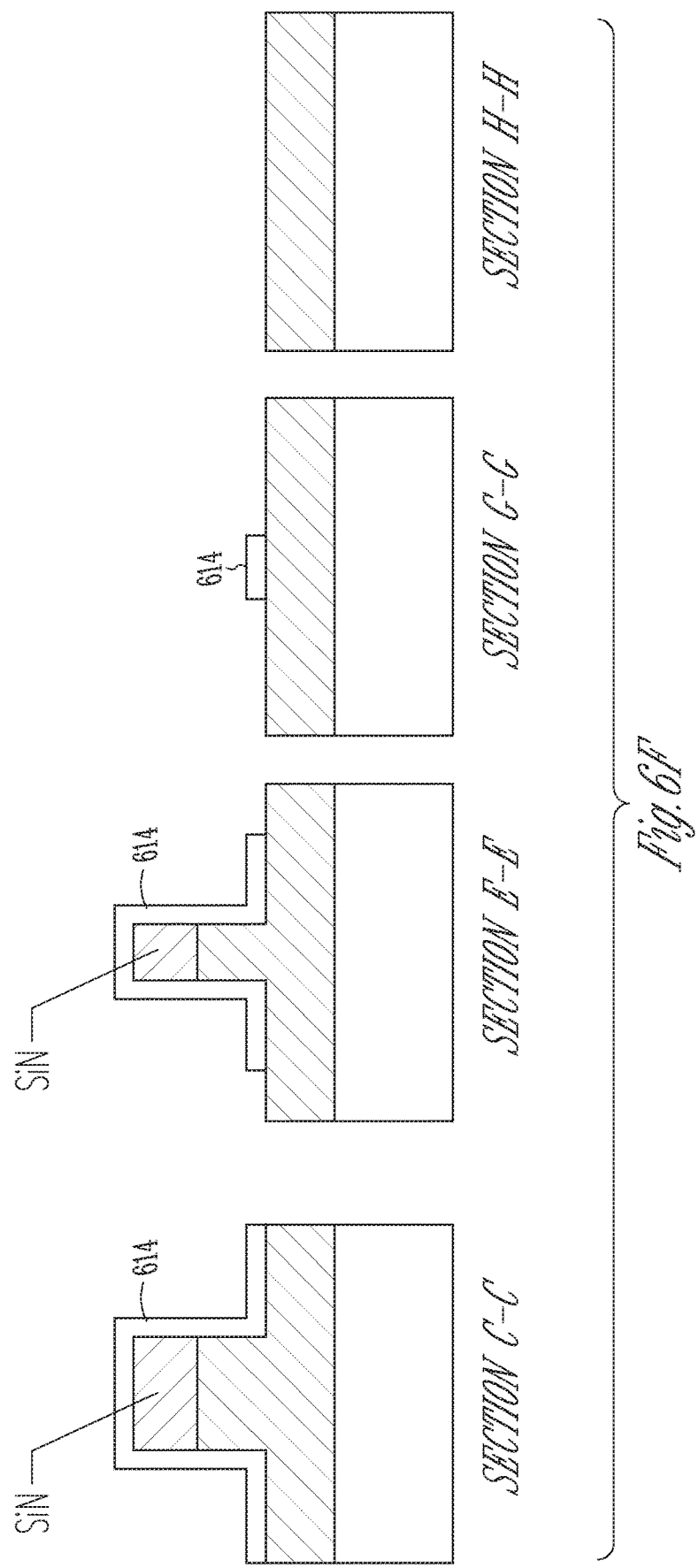

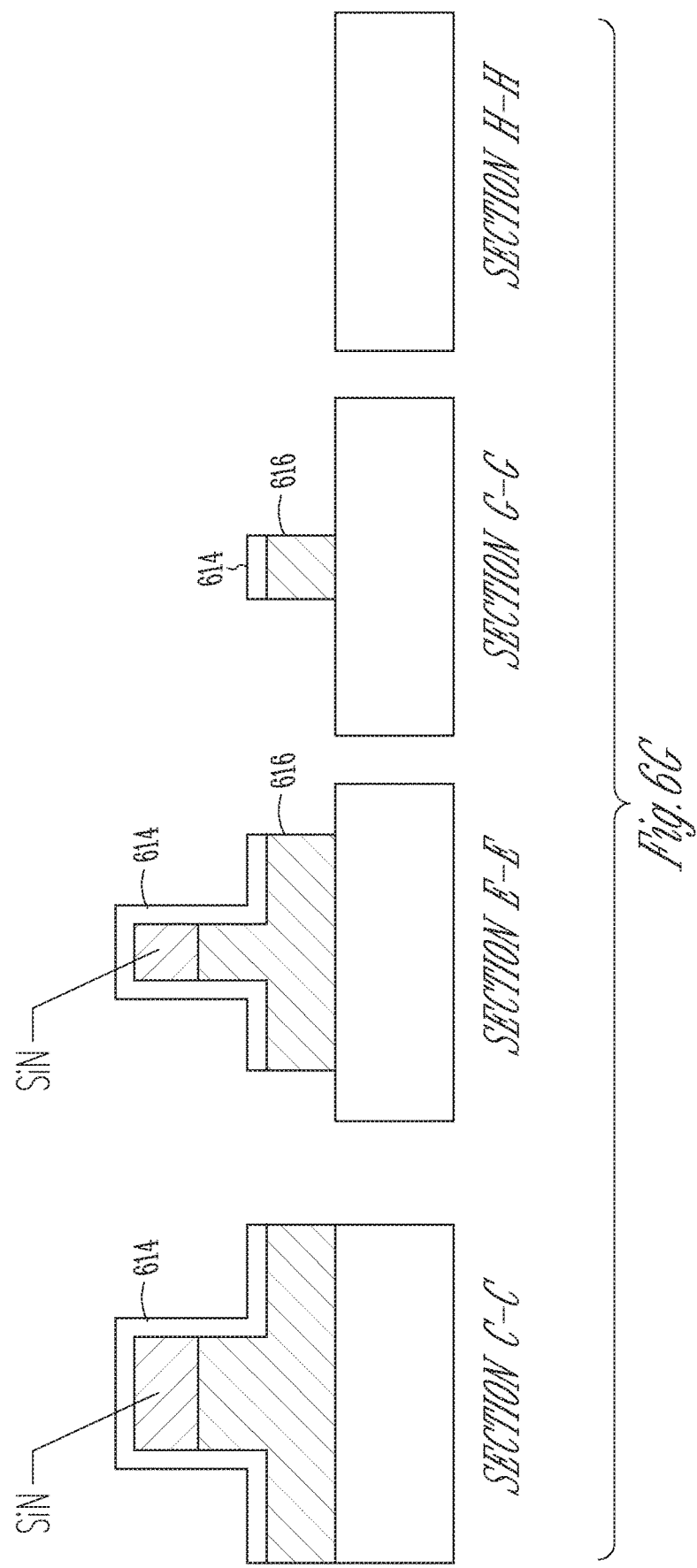

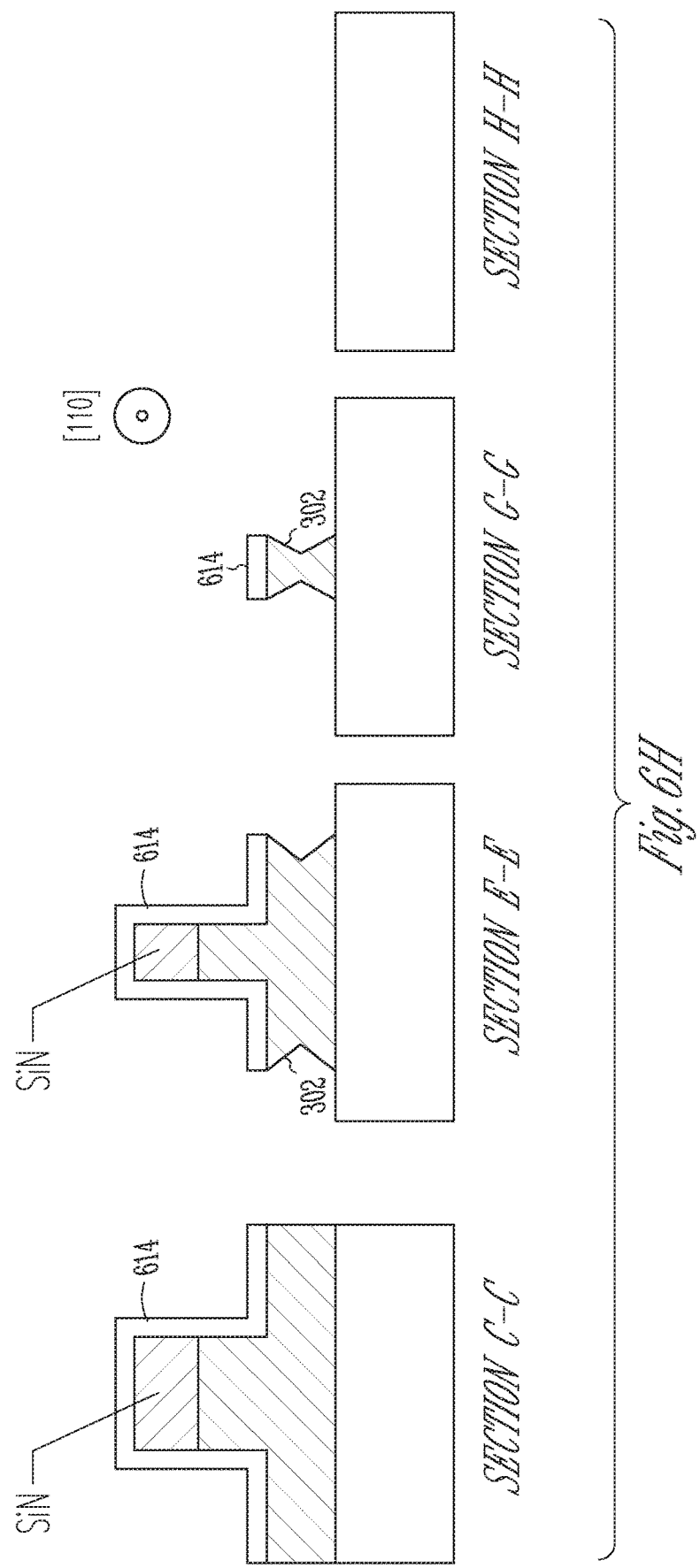

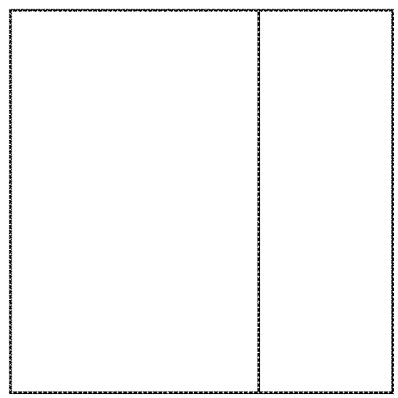
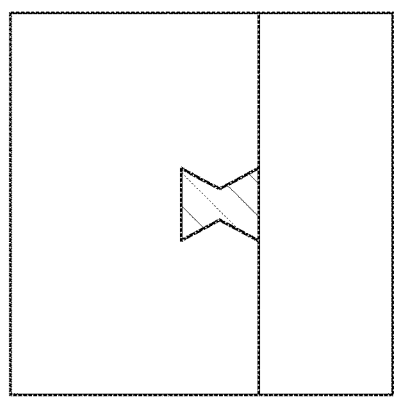
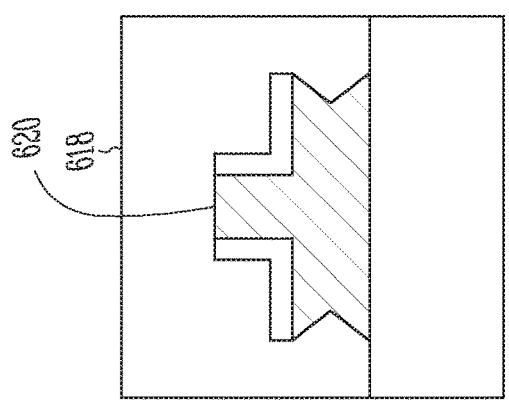
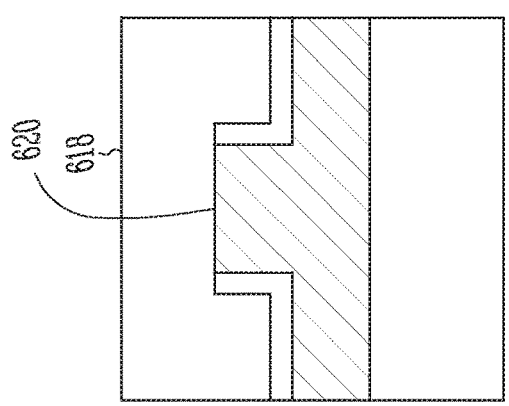
Fig. 6I

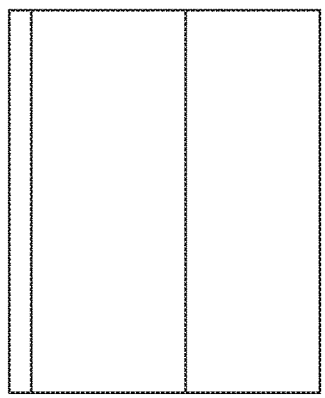
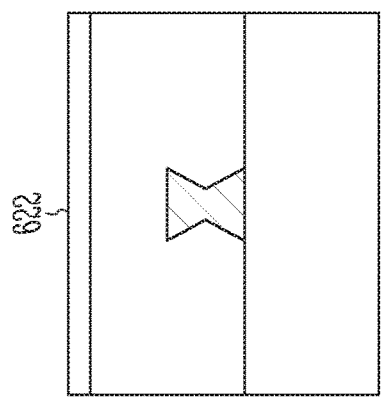
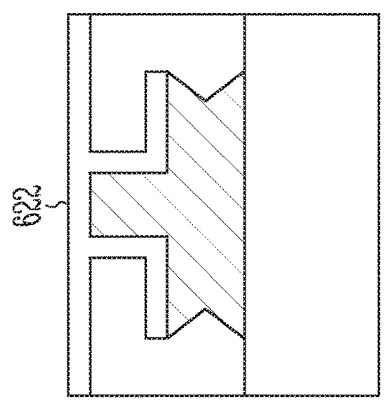
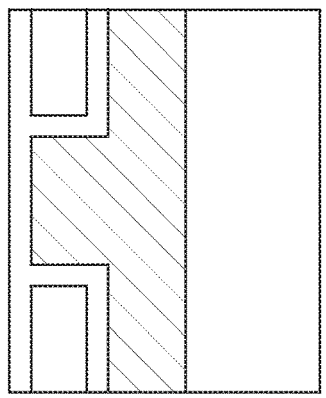
Fig. 6K

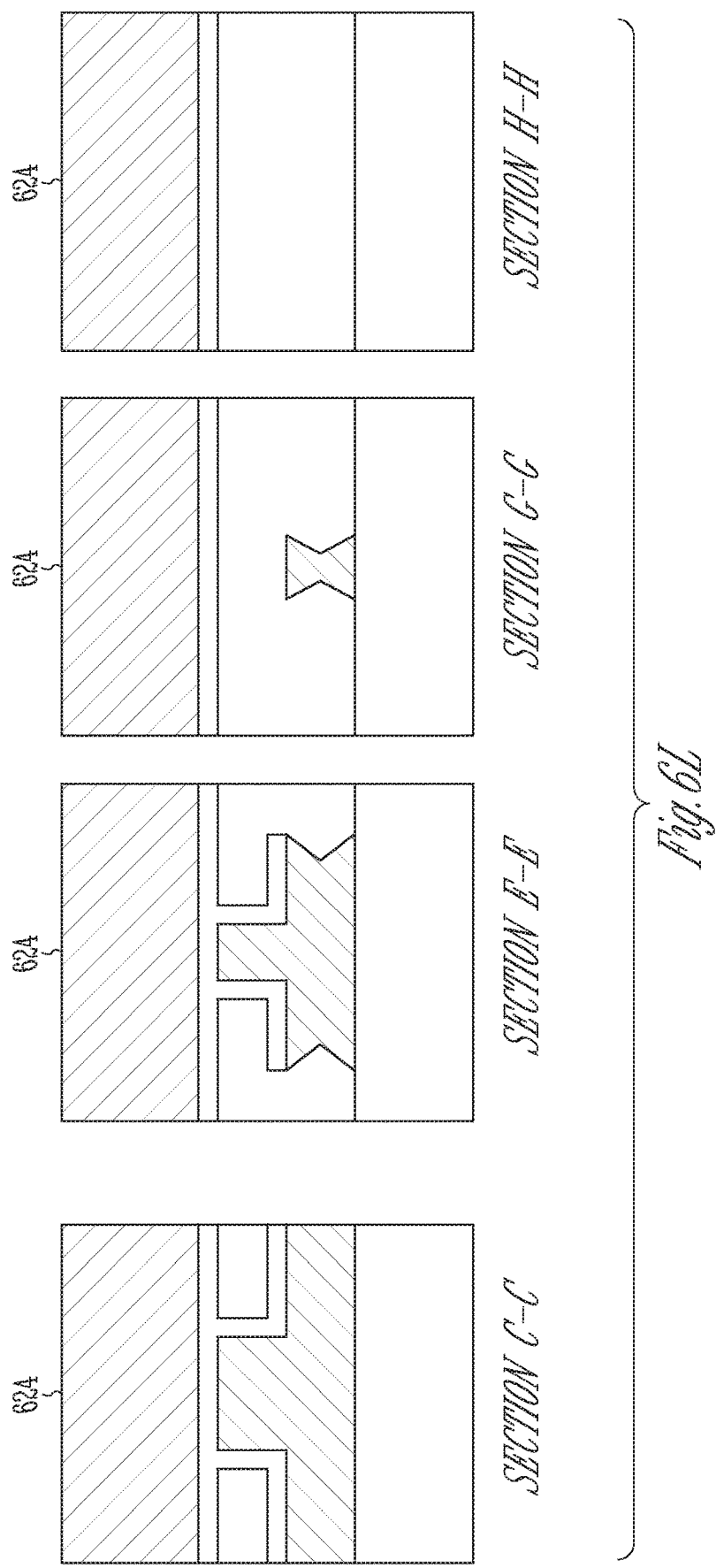

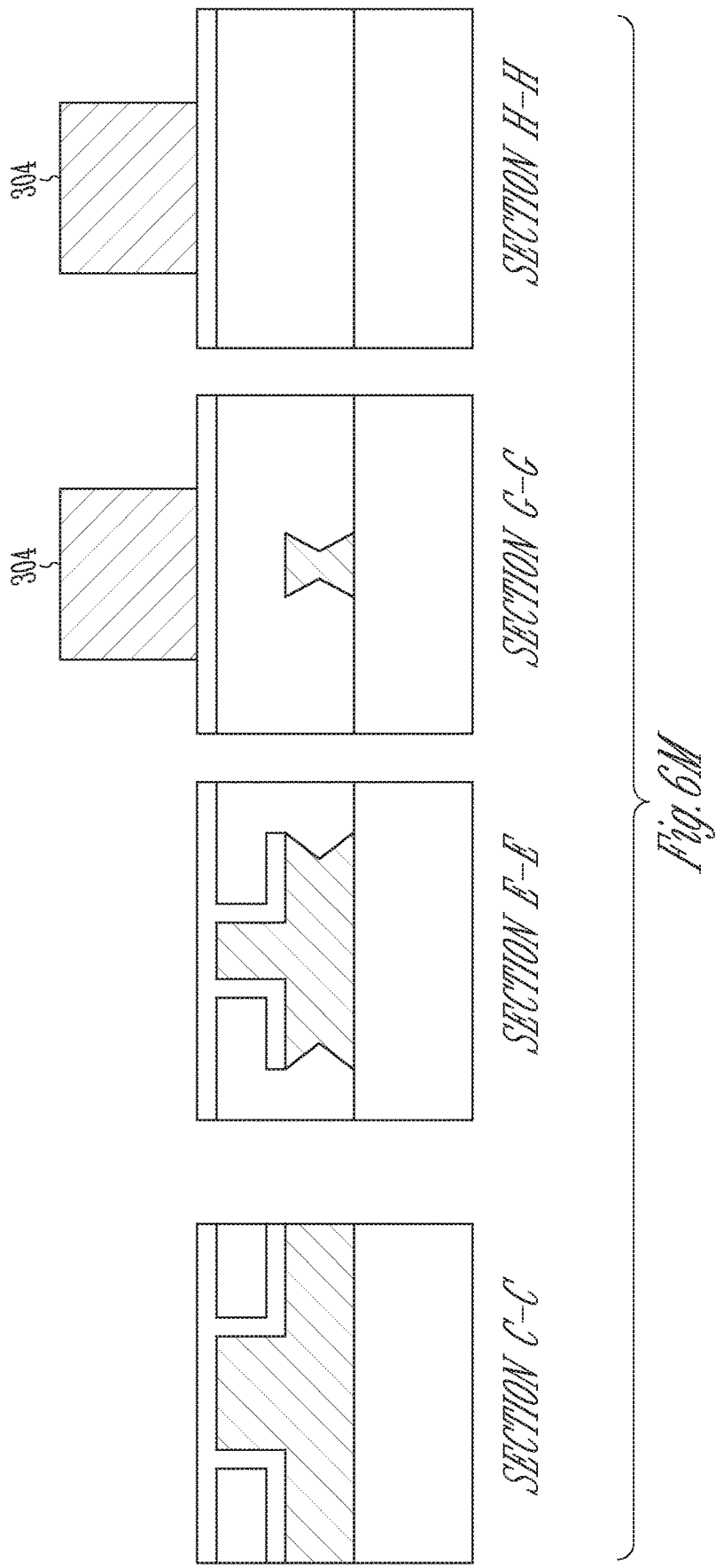

SMOOTH WAVEGUIDE STRUCTURES AND MANUFACTURING METHODS

TECHNICAL FIELD

This disclosure relates to integrated optical structures and methods for manufacturing them. Some embodiments concern, in particular, optical mode converters.

BACKGROUND

Many photonic integrated circuits (PICs) include mode converters that transfer light between different device layers from one waveguide to another. For example, PICs otherwise implemented in silicon may utilize, at the input(s) and/or output(s) of the PIC, silicon-nitride-based grating couplers because they can operate across a wider temperature range than silicon-based couplers. In this case, the mode converter serves to couple light from a silicon waveguide in the silicon device layer into a silicon-nitride waveguide disposed above the silicon waveguide and coupled to the silicon-nitride grating coupler (or vice versa). In the coupling region, the silicon waveguide is tapered down to a small cross section. Over a large portion of the taper, light is therefore highly confined to a small cross-sectional area, which makes the light more sensitive to any surface roughness. The relatively high surface roughness achieved with conventional manufacturing techniques tends to result in a correspondingly high scattering loss from this portion of the taper. The high scattering loss, in turn, contributes to a higher insertion loss for the device, and the backscattered portion of the scattered light contributes to a higher return loss.

SUMMARY

Disclosed herein are semiconductor structures and manufacturing methods that result in waveguides with smooth sidewalls for use, e.g., in low-loss mode converters. In accordance with various embodiments, a semiconductor wire waveguide created by etching the semiconductor device layer of a semiconductor-on-insulator substrate (e.g., the silicon device layer of a silicon-on-insulator (SOI) substrate) down to the insulator (e.g., silicon oxide) layer is smoothed by an additional crystallographic etch, resulting in smooth sidewall portions coinciding with the crystallographic planes of the wire waveguide. The crystallographic smoothing etch may be pinned between the insulator layer of the substrate and an etch mask layer disposed on top of the semiconductor device layer, forming a cross-sectionally triangular undercut into the wire waveguide, with sidewall portions extending inward from the edges of the top and bottom surfaces of the waveguide to meet at a medial horizontal plane. In the corresponding cross section of the wire waveguide, which roughly resembles an "hourglass" in shape, the minimum width (corresponding to the "waist" at the medial plane) is smaller than the width at the top surface (herein also the "defined width") of the wire waveguide, which is the width defined via photolithographic patterning of the etch mask used in the wire-waveguide forming etch. Beneficially, this shape reduces the cross-sectional area of the waveguide, compared with a waveguide of the same defined width that has substantially straight vertical sidewalls (wherein "substantially" allows for small manufacturing deviations from perfectly vertical sidewalls, e.g., with angles of up to 5°), allowing smaller cross sections to be achieved without the need for smaller patterned features.

Since any given semiconductor manufacturing process (also often referred to as a "process node" or "technology node") is limited by the smallest patternable feature it can achieve, and since manufacturing costs generally increase significantly with smaller feature sizes, the ability to reduce the cross section of the waveguide without reducing the defined width can entail cost savings in applications where a small waveguide cross section is desirable. Such applications include, for example, mode converters, where a small cross section of the wire waveguide (e.g., made of silicon) may serve to match the effective index of the wire waveguide with that of a second waveguide made from a material with lower refractive index (such as, e.g., silicon nitride). Importantly, achieving small waveguide cross sections simultaneously with smooth waveguide sidewalls improves device performance due to reduced scattering losses and improved phase coherence. Applications that rely on good phase coherence include, e.g., finite impulse response (FIR) filters, which include two or more waveguides with fixed and deterministic phase offsets therebetween.

In one aspect, the present disclosure provides an integrated optical structure including a semiconductor-on-insulator substrate comprising a semiconductor device layer and a wire waveguide formed in the semiconductor device layer. The wire waveguide may be tapered in width. The wire waveguide has a top surface and sidewalls, and, along at least a portion of its length, the sidewalls do not extend laterally (meaning, along a direction defined by the intersection of the waveguide cross section with the plane of the substrate) beyond the top surface (corresponding to the defined width) of the wire waveguide and substantially consist of sidewall portions coinciding with crystallographic planes of the wire waveguide. (In this context, the term "substantially" allows for small transitional areas between the sidewall portions or between a sidewall portion and the top or bottom surface of the waveguide that do not necessarily coincide with the crystallographic planes. Such transitional areas, if present at all, amount to only a small fraction of the overall sidewall area, e.g., less than 1%.) The sidewall portions may include, along at least the portion of the length of the wire waveguide, one or more planar upper portions extending from a top edge of the wire waveguide at an acute angle (that is, an angle smaller than 90°) with respect to the top surface of the wire waveguide and one or more planar lower portions extending from a bottom edge of the wire waveguide at an acute angle with respect to a bottom surface of the wire waveguide, the upper and lower portions meeting at a medial horizontal plane of the wire waveguide. Multiple planar upper and lower portions may occur along the length of the waveguide, e.g., as a result of waveguide tapering in width. The individual sidewall portions coinciding with crystallographic planes may each be atomically smooth. The surface roughness the waveguide walls (e.g., measured in terms of the root mean square roughness, which is the standard deviation of the surface position) may be sub-nanometer, rendering the sidewalls optically smooth at standard operating wavelengths (which are on the order of a micrometer). In one embodiment, the wire waveguide has, along a portion of the waveguide having a width of less than 0.5 µm, return losses less than −40 dB/mm across an operating wavelength range (e.g., the range from 1200 nm to 1400 nm).

The integrated optical structure may further include a rib waveguide formed in the semiconductor device layer on top of and parallel to the wire waveguide, and the rib waveguide may be tapered, in width and/or height, in the same direction along the length (or axis) of the rib waveguide as the wire waveguide. Further, at the narrow end of the tapered wire waveguide, a second waveguide made from a different material may be disposed above or below the wire waveguide (optionally with a cladding layer between the wire waveguide and the second waveguide), the wire waveguide and the second waveguide together forming a waveguide mode converter. In various embodiments, the refractive index of the wire-waveguide material is greater than the refractive index of the material of the second waveguide. For example, the wire waveguide may be made of silicon and the second waveguide of silicon nitride.

In another aspect, a PIC including an optical mode converter may be provided. The optical mode converter may include a first waveguide made of a first material and tapered towards one end, and, disposed above or below the first waveguide at the tapered end, a second waveguide made of a second material, a refractive index of the first material being greater than a refractive index of the second material. The first waveguide is a wire waveguide having a top surface and sidewalls that, along at least a portion of a length of the wire waveguide, do not extend laterally beyond the top surface of the wire waveguide and substantially consist of sidewall portions coinciding with crystallographic planes of the wire waveguide. The wire waveguide may be formed in a silicon device layer of a silicon-on-insulator substrate, and the second waveguide may be formed in a silicon-nitride layer disposed above the silicon device layer (the silicon and silicon-nitride layers optionally being separated by a cladding layer). The PIC may further include a silicon-nitride grating coupler coupled to the second waveguide and one or more silicon devices coupled to the wire waveguide.

In yet another aspect, the present disclosure pertains to a method of manufacturing an integrated optical structure. The method involves creating a wire-waveguide etch mask above a semiconductor device layer of a semiconductor-on-insulator substrate, dry-etching the masked semiconductor device layer down to an insulator layer of the substrate to form a semiconductor wire waveguide with exposed sidewalls, and crystallographically wet-etching the semiconductor wire waveguide to smoothen the exposed sidewalls, the etch being pinned between the insulator layer of the substrate and the wire-waveguide mask. For the crystallographic wet etch, an anisotropic etchant with an etch-rate ratio of at least 20 may be used. The etchant may, for example, include tetramethyl ammonium hydroxide. The method may further include, prior to creating the wire-waveguide etch mask, creating a rib-waveguide etch mask above the semiconductor device layer and partially etching the semiconductor device layer to form a semiconductor rib waveguide, wherein the semiconductor wire waveguide is formed at least in part running underneath the rib waveguide. The rib-waveguide etch mask and the wire-waveguide etch mask may both be tapered so as to result in tapering of the semiconductor rib waveguide and the semiconductor wire waveguide in a common direction. In some embodiments, the semiconductor rib waveguide is tapered vertically down to vanishing. The semiconductor device layer and the semiconductor wire waveguide may be made of silicon, and a silicon-nitride waveguide may further be created above the silicon wire waveguide depositing a silicon nitride layer above the top silicon layer, and patterning and etching the silicon nitride layer.

BRIEF DESCRIPTION OF THE DRAWINGS

The foregoing will be more readily understood from the following detailed description of various example embodiments, in particular, when taken in conjunction with the drawings, in which:

FIG. 2A shows a unit cell of a silicon crystal lattice.

FIG. 2B illustrates various crystal directions in a top view of an example (100) SOI wafer in accordance with various embodiments.

FIG. 2C illustrates various crystal directions in a cross-sectional view of an example wire waveguide oriented in the [110] direction, in accordance with various embodiments.

FIG. 4 is a top view of an example PIC including an input/output coupler and a mode converter, in accordance with various embodiments.

FIGS. 6A-6M are cross-sectional views of the optical structure at various stages of the manufacturing method of FIG. 5.

DETAILED DESCRIPTION

The present disclosure relates, in various embodiments, to integrated optical structures implemented on semiconductor-on-insulator substrates, herein understood to be layered substrates that include a semiconductor layer disposed on top of an electrically insulating, dielectric layer, which is, in turn, usually disposed on another semiconductor layer that serves as a mechanical base layer or "handle." The optical structures are formed at least partially in the top semiconductor layer, which is therefore also referred to as the "semiconductor device layer." In SOI substrates, the handle and semiconductor device layers are made of silicon, and the insulator layer is often made of silicon dioxide. Alternative semiconductor-on-insulator substrates may use, for instance, germanium, silicon-germanium, or a compound semiconductor such as a III-V material (e.g., gallium arsenide or indium phosphide) for the semiconductor device layer. Additional layers of material or device components, such as a dielectric cladding layer, one or more further semiconductor components, and/or metal contacts for electrical connections may be disposed above the semiconductor device layer. In the absence of a cladding layer, air serves as the cladding. Certain embodiments described herein include silicon waveguides formed in SOI substrates, in some instances in conjunction with silicon nitride waveguides disposed above the silicon waveguides. The principles, structural features, and manufacturing steps discussed herein are, however, generally also applicable to other materials and material combinations, subject to any needs or preferences of a given application. For example, instead of implementing a waveguide in the semiconductor device layer of a semiconductor-on-insulator substrate, semiconductor (e.g., indium phosphide) waveguides as described in the following may be grown with one or more intervening epilayers on a semiconductor (e.g., indium phosphide) substrate; in this case, the epilayer(s), used in lieu of the insulator layer of a semiconductor-on-insulator substrate, serve as the stop layer.

Figure 1A:
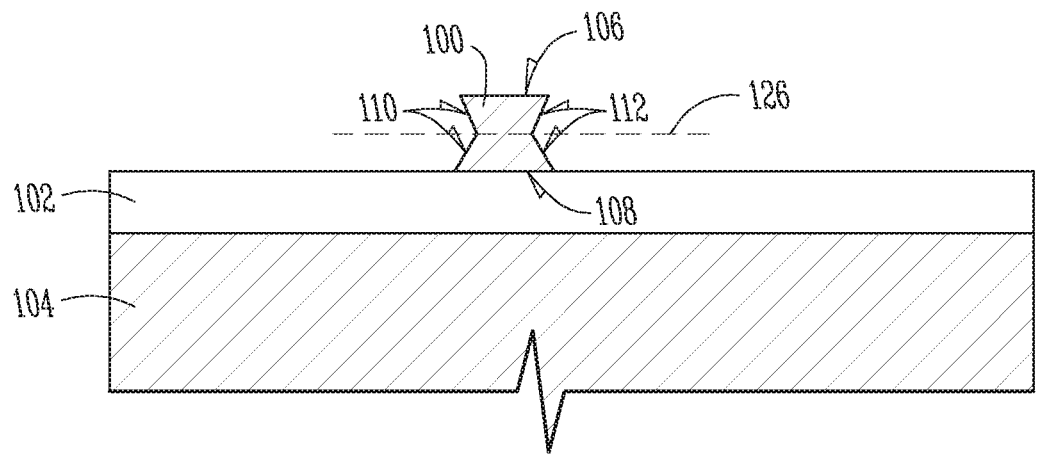
FIG. 1A is a schematic cross-sectional view of an example wire waveguide implemented in a semiconductor-on-insulator substrate, in accordance with various embodiments.
Figure 1B:
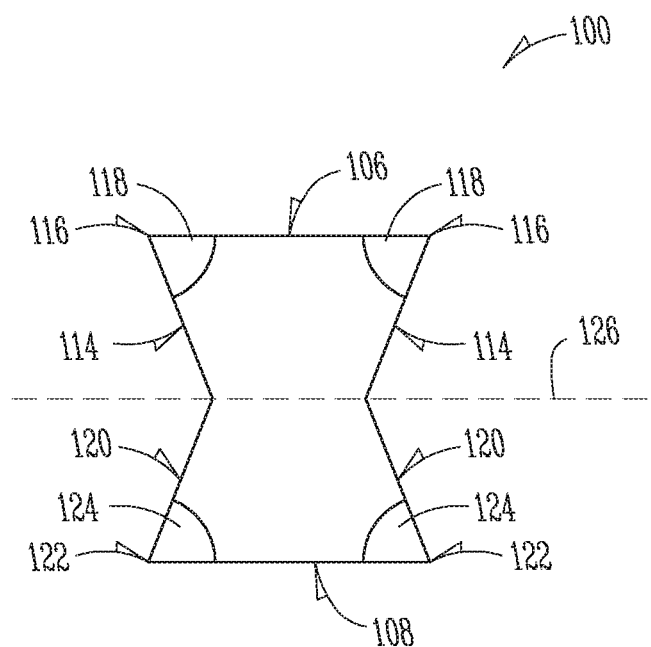
FIG. 1B is an enlarged detail view of the wire waveguide of FIG. 1A.

FIGS. 1A and 1B illustrate a wire waveguide 100, in accordance with various embodiments, in schematic cross-sectional view. A "wire waveguide" herein denotes a waveguide that sits directly on top of the insulator layer underneath the semiconductor device layer in which the waveguide is formed—as distinguished from, for instance, a rib waveguide, which sits on an intervening layer or slab of the same semiconductor material from which the rib waveguide is made. Wire waveguides can be created by etching the semiconductor device layer of a substrate all the way down to the insulator layer, whereas rib waveguide may result from a partial etch of the semiconductor device layer. FIG. 1A shows a wire waveguide 100 made of a semiconductor material (herein indicated by hatching) disposed on an insulator layer 102, which itself is disposed on a semiconductor (e.g., silicon) handle 104 (only partially shown). In the portion of the substrate shown, the semiconductor device layer is completely removed except for the material forming the wire waveguide 100. The wire waveguide 100 has planar top and bottom surfaces 106, 108 (the bottom surface 108 being formed at the interface with the insulator layer 102), and sidewalls 110, 112 each formed of two planar portions.

As FIG. 1B shows, in an enlarged detail view, the sidewalls 110, 112 have upper portions 114 that extend from the top edges 116 (corresponding to corners in the cross-sectional view) at respective acute angles 118 with respect to the top surface 106. Similarly, lower portions 120 of the sidewalls 110, 112 extend from the bottom edges 122 at respective acute angles 124 with respect to the bottom surface 108 (the angles 118, 124 all being of the same size in the depicted embodiment). The upper and lower sidewall portions 114, 120 meet at approximately half the height of the wire waveguide 100 at a medial horizontal plane 126 (indicated by a dashed line), forming what can be described as an "hourglass" shape. This shape can be achieved, as described in detail further below, by etching initially straight vertical sidewalls crystallographically, whereby material is removed to form sidewall portions 114, 120 coinciding with crystallographic planes.

As will be appreciated by those of ordinary skill in the art, changes in width of the wire waveguide 100 along its length (i.e., in a direction perpendicular to the plane of the drawing) cause discontinuities generally resulting in multiple planar upper and lower sidewall portions 114, 120 along the length of the wire waveguide 100. For example, a width taper of the wire waveguide 100, as used in various embodiments, may result from many discontinuities each approximately an atomic layer in thickness. These discontinuities form the boundaries of the individual planar upper and lower sidewall portions 114, 120. In other words, the sidewalls in their entirety do not each coincide with a single crystallographic plane for the upper portion and a single crystallographic plane for the lower portion; however, within each waveguide segment of constant width, the corresponding upper and lower sidewall portions 114, 120 coincide with respective crystallographic planes. The individual side wall portions tend to be atomically smooth due to their coincidence with crystallographic planes, and the residual surface roughness (e.g., the root mean square roughness) along the length of the taper resulting from the discontinuities is on the order of a single atomic layer thickness. Consequently, even in the tapered region, the surface roughness of the sidewalls is much smaller than the natural variation of roughness occurring with standard photolithographic and dry etching processes. In various embodiments, the sidewalls of the wire waveguide 100 have a surface roughness in the sub-nanometer range, which is orders of magnitudes below the wavelength of the guided light (which may be, e.g., 1300 nm or 1550 nm, depending on the application); the sidewalls are, in that sense, optically smooth. Beneficially, not only does the smoothness of the sidewalls provide for low scattering losses, but the sidewalls also do not extend laterally beyond (and, in fact, form a waist smaller than) the defined width of the wire waveguide, which reduces the cross-sectional area.

FIG. 2A shows a unit cell 200 of a silicon crystal lattice, spanned by the translations vectors $\vec{a}_1, \vec{a}_2, \vec{a}_3$. As can be seen, single-crystal silicon has a diamond cubic crystal structure, that is, it forms a face-centered cubic (fcc) lattice with a basis of two atoms associated with each lattice point of the fcc lattice at coordinates (0, 0, 0) and (¼, ¼, ¼) (expressed in multiples of the translations vectors $\vec{a}_1, \vec{a}_2, \vec{a}_3$ and taken relative to the respective lattice points). A crystal direction can be straightforwardly expressed in vector-component notation, using as basis vectors the translations vectors $\vec{a}_1, \vec{a}_2, \vec{a}_3$, crystal directions are customarily notated by enclosing the vector components in square brackets, and families of directions that are equivalent by symmetry are notated in chevrons ("< >"). For cubic lattices, the translation vectors $\vec{a}_1, \vec{a}_2, \vec{a}_3$ may also serve as the standard basis vectors of a Cartesian coordinate system having its origin at one of the corners of a unit cell 200 within the lattice. Crystal planes are commonly characterized by Miller indices, which are the inverses of the intercepts of the respective plane with the crystal axes (which extend through the origin along the translation vectors $\vec{a}_1, \vec{a}_2, \vec{a}_3$), normalized to form a triplet of integers; Miller indices are commonly enclosed in parentheses, and families of planes equivalent by symmetry are notated in braces. Negative values are indicated by bars above the respective indices. For cubic lattices, the Miller indices of a given plane are also the vector components of the crystal direction normal to that plane. For example, the (100) plane is normal to the [100] direction.

Silicon and SOI wafers come in different orientations of their macroscopic features (such as their top surface 106 and, if applicable, the "flat" along which a segment of an otherwise circular wafer is cut off) relative to the silicon crystal orientations. FIG. 2B shows, for example, a (100) SOI wafer 220 in top view. In a (100) SOI wafer 220, the normal to the silicon device layer (i.e., the normal to the top and bottom surfaces 106, 108 of the silicon device layer) is in the [100] direction. Overlaid onto the wafer shape, FIG. 2B also shows various crystal directions (e.g., [010], [001], etc.) within the plane of the wafer 220. To physically distinguish the crystal directions, the wafer 220 may be marked with a flat or a notch in its circumference. For example, the notch 222 shown in FIG. 2B indicates the intersection of the circumference with a radius of the wafer 220 that is aligned with the [011] direction.

In some embodiments, wire waveguides within a (100) SOI wafer 220 are oriented in the [011] or [0$\bar{1}$1] directions; accordingly, their cross-sections (normal to the waveguide axes) are parallel to the (011) and (0$\bar{1}$1) crystal planes, respectively. FIG. 2C shows a wire waveguide 240 oriented in the [011] direction. Straight vertical sidewalls 242 (indicated with dashed lines) of such a wire waveguide 240 would correspond to the planes parallel to the (0$\bar{1}$1) crystal plane. If these walls are further etched with an anisotropic etchant, however, the etchant removes material until it reaches the first plane within the {111} family, and then slows down or stops etching because the {111} planes are denser than other crystal planes. Accordingly, with an anisotropic etch, surfaces in the {111} family are created. If the etch is "pinned" between the top and bottom surfaces 106, 108 of the wire waveguide 240, e.g., by virtue of a masking layer resistant to the etchant applied to the top, the etch will proceed simultaneously upward from the bottom surface 108 and downward from the top surface 106, resulting in the upper and lower sidewall portions 114, 120 meeting at the medial plane 126 as depicted in FIG. 1B. The angle 118, 124 between the sidewall portions 114, 120 and the top and bottom surfaces 106, 108, respectively, is the angle between the (111) and (100) crystallographic planes, which is 54.7°. Different orientations of the SOI wafer 220 and/or the wire waveguide 240 relative to the crystal directions, or the use of materials with different crystal structure, may result in different angles 118, 124 of the sidewall portions 114, 120.

Wire waveguides 100, 240, as described above, may find use in various applications. For example, in a mode converter that couples light between waveguides of different materials having different respective indices of refraction (e.g., silicon and silicon nitride), the waveguide with the higher index of refraction may be tapered down in the coupling region to match the effective index of the other waveguide, and in order to achieve a low cross section while avoiding excessive scattering losses at the narrow end of the taper and maintaining good phase coherence, the tapered waveguide may take the shape of a wire waveguide 100, 240 with atomically smooth sidewalls tilted inward to form a waist narrower than the waveguide width. A mode converter may be used as a subcomponent within the delay arm(s) of an FIR filter (e.g., a single-delay filter such as an asymmetric Mach-Zehnder interferometer, or a many-delay filter such as a lattice filter or arrayed waveguide grating (AWG)), allowing the delay(s) to be implemented entirely in silicon nitride (or another material with low temperature sensitivity) to render the filter spectrum temperature-insensitive. The mode converter may, in this case, transfer the light from the silicon-nitride delay section(s) to the temperature-sensitive sections of the waveguide, which may be kept equal in length across interferometer arms such that their temperature dependence does not cause the spectrum to shift with ambient temperature. Alternatively, all interferometer arms may include both silicon sections and silicon nitride sections, whose lengths may differ between the interferometer arms in such a way that the overall temperature sensitivity (accounting for the smaller, but non-zero sensitivity of the silicon nitride) of the filter is further reduced. Similar principles can be applied to waveguides of different polarization sensitivities (using a mode converter to transfer light between them) to make polarization-insensitive filters. Various of these applications a contingent upon good phase coherence.

Outside the realm of mode converters, wire waveguides 100, 240 as described herein may be used, e.g., in bend sections of any device to reduce the footprint of the device. As another example, an interferometric wavelength locker may utilize two waveguides of different widths as the interferometer arms, achieving the different widths by using a rib waveguide in one arm and a wire waveguide 100, 240 in the other arm. Yet another application involves the use of a wire waveguide layer as the grating coupler layer in a PIC.

Figure 3A:
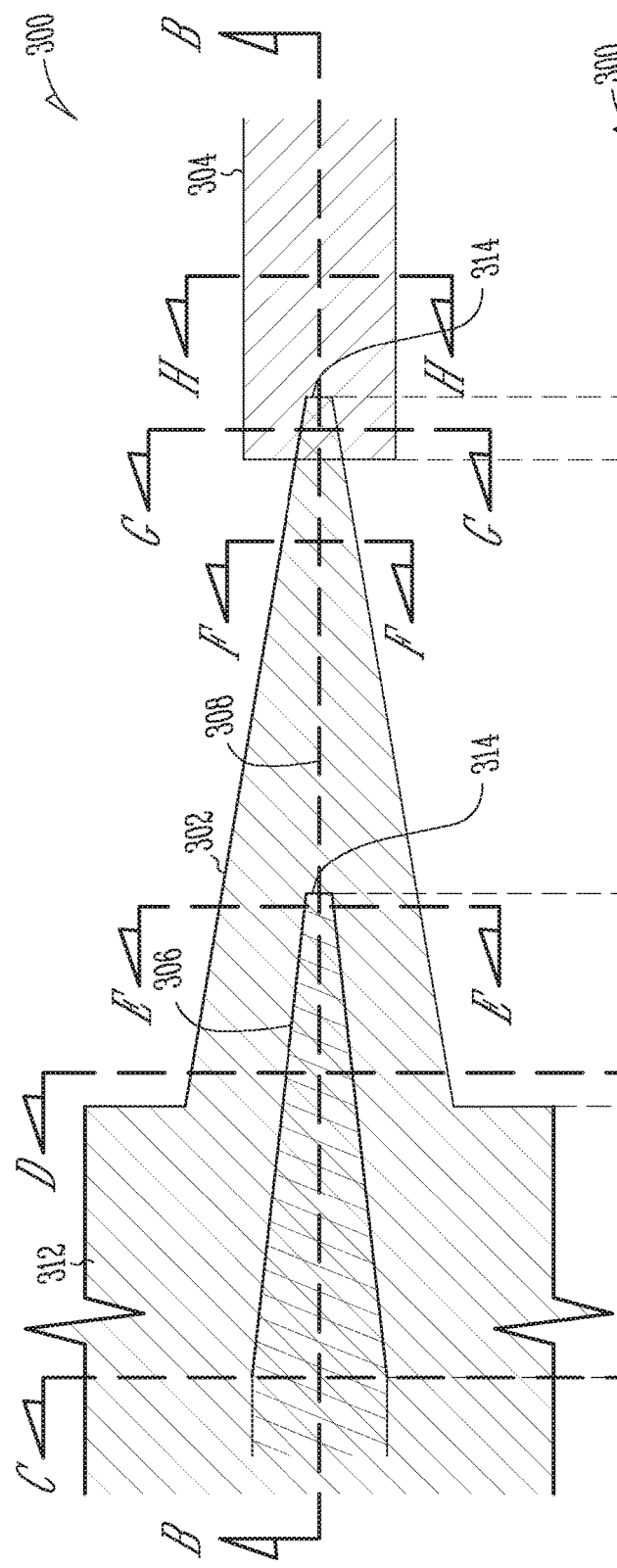
FIGS. 3A and 3B are top and sectional side views, respectively, of a mode converter in accordance with various embodiments.
Figure 3B:
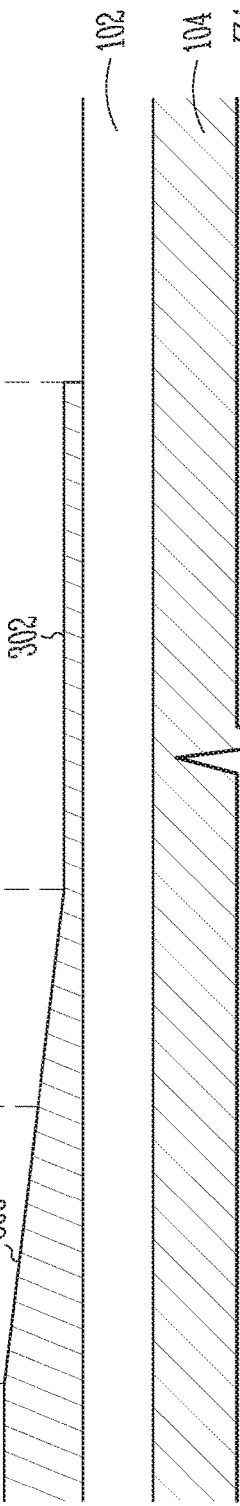

FIGS. 3A and 3B are a top view and a sectional side view, respectively, of a mode converter 300, in accordance with various embodiments; the views are aligned to correlate the waveguide widths and the vertical structure of the waveguides along the length of the waveguides. Further, FIGS. 3C-3H show cross sections of the mode converter 300 taken perpendicular to the waveguide axis at various positions along the length of the waveguides. The sectional side view and cross-sectional views in FIGS. 3B-3H also show the insulator layer 102 and a portion of the semiconductor handle 104 of the substrate in which the mode converter 300 is formed.

The mode converter 300 includes a wire waveguide 302, a top waveguide 304, and a rib waveguide 306. Projected into the plane of the wafer 220 (as depicted in FIG. 3A), the three waveguides 302, 304, 306 are aligned along a common axis 308, and the wire waveguide 302 overlaps at one end with the rib waveguide 306 and at the other end with the top waveguide 304. Thus, the wire waveguide 302 acts as a bridge between the rib waveguide 306 and the top waveguide 304 that can couple light from one to the other. The wire waveguide 302 runs directly underneath, and forms an integral structure with, the rib waveguide 306. The wire and rib waveguides 302, 306 are made from a first semiconductor material, and the top waveguide 304 is made from a second, different dielectric or semiconductor material that has a lower index of refraction. In certain embodiments, the wire and rib waveguides 302, 306 are, for instance, silicon waveguides, which has a refractive index of about 3.4 in the optical and infrared regime, and the top waveguide 304 is made of silicon nitride, whose refractive index is about 2.0. Alternative materials for the top waveguide 304 include tantalum pentoxide (also having a refractive index of about 2.0) and titanium dioxide, for example. As shown, the wire and top waveguides 302, 304 may be separated vertically by an intermediate layer of dielectric cladding 310. However, embodiments in which the top waveguide 304 sits directly on top of and is in contact with the wire waveguide 302 in the overlap region are also conceivable. If a dielectric cladding 310 is present, its refractive index is lower than that of the top waveguide 304. A commonly used cladding material is, for example, silicon dioxide, which has a refractive index of about 1.4.

Figure 3C:
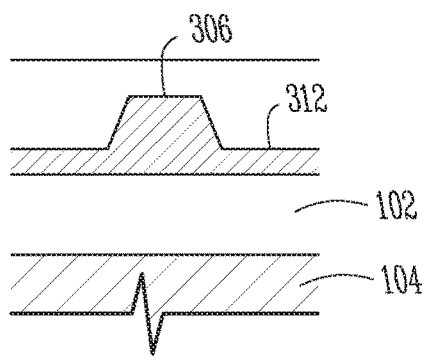
FIGS. 3C-3H are cross-sectional views of the mode converter shown in FIGS. 3A and 3B at various positions along a waveguide axis.
Figure 3D:
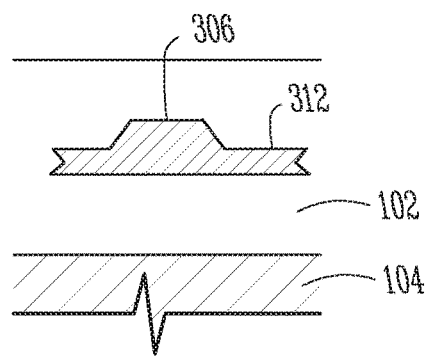
Figure 3E:
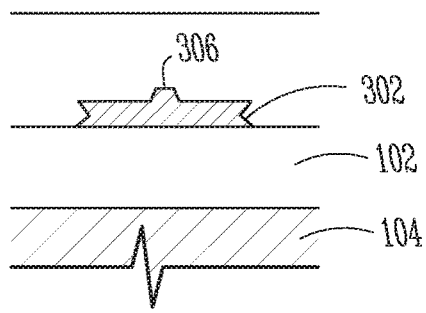
Figure 3F:
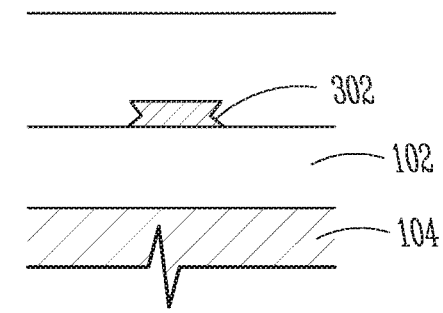
Figure 3G:
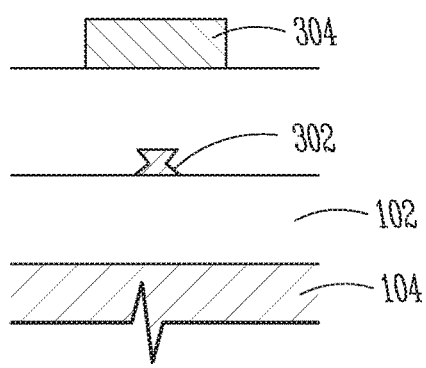
Figure 3H:
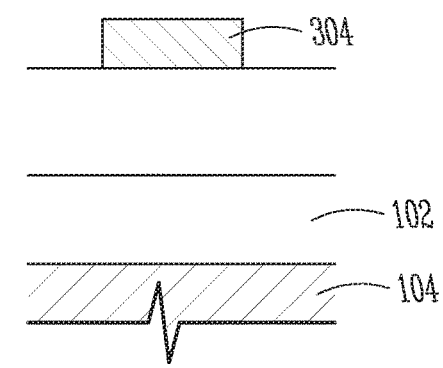

With reference to FIGS. 3A-3C, the rib waveguide 306 generally results from etching the semiconductor device layer of the SOI substrate only partially, leaving a slab 312 of semiconductor material from which the rib waveguide 306 extends. The wire waveguide 302 is formed within that slab 312 by etching the semiconductor device layer all the way down to the insulator layer 102, leaving only a strip of semiconductor material running under the rib waveguide 306 (the strip being wider than the rib waveguide 306 itself), as illustrated, e.g., in FIG. 3D. The rib waveguide 306 may be tapered down in width (as shown in FIG. 3A) and/or height (as shown in FIG. 3B) in the region overlapping the wire waveguide 302 and/or the immediately preceding region; in some embodiments, the rib waveguide 306 tapers down to vanishing (at point 314) in the overlap region. The rib-waveguide taper is also illustrated in the sequence of cross sections depicted in FIGS. 3C-3F, with FIGS. 3C-3E showing the rib waveguide 306 with progressively decreasing width and height, and FIG. 3F depicting a cross section beyond the vanishing point, where the rib waveguide 306 has completely disappeared.

The wire waveguide 302 may likewise be tapered (in width), as shown in FIGS. 3A and 3D-3G, and that taper is in the same direction along the length of the waveguides (or, put differently, along the axis 308) as the rib-waveguide taper, such that the cross-sectional areas of the wire and rib waveguides 302, 306 decrease in the same direction. The tapered wire waveguide 302 extends past the vanishing point 314 of the rib waveguide 306. In a region where the cross section of the wire waveguide 302 has become very small (FIG. 3G), the top waveguide 304 begins. At some point (point 316), the wire waveguide 302 ceases, leaving only the top waveguide 304. In the overlap region between the wire waveguide 302 and the top waveguide 304, light travelling in the wire waveguide 302 is "squeezed out" of the wire waveguide 302 and into the top waveguide 304 above. The reduced cross-sectional area of the wire waveguide 302 (compared with that of the top waveguide 304) serves to match the effective indices of the two waveguides (or at least reduce the effective-index difference) in the overlap region for efficient coupling. The top waveguide 304 may have constant width and height, as shown in FIGS. 3A, 3B, 3G, and 3H, or may, alternatively, be tapered. If tapered, the width and/or height of the top waveguide 304 may increase in the direction in which the width and/or height of the rib and wire waveguides 306, 302 decrease. As discussed above, the mode converter 300 may be used in various applications, for example, in conjunction with an input-output coupler of a PIC as described below in FIG. 4, or in an AWG that uses silicon for one waveguide arm and silicon nitride for the other one in order to take advantage of the lower temperature-sensitivity of silicon nitride for improved wavelength stability.

FIG. 4 shows, in top view, a portion of an example PIC 400 utilizing a mode converter 300 as described above, in accordance with various embodiments. The PIC 400 includes an input/output coupler (or "transceiver") 402 that serves to receive incoming optical signals from off-chip sources and/or to route outgoing optical signals off-chip. The input/output coupler 402 has two PIC-side incoming waveguides 406, 408, and may be implemented as a grating coupler made of silicon nitride, or some other material having a lower refractive index than silicon. Compared with silicon, silicon nitride may have lower optical losses, and is less temperature-sensitive, allowing a silicon-nitride-based input/output coupler 402 to operate reliably across a wider temperature range. For most other (or all) other devices in the PIC 400, however, silicon is usually used. Beneficially, silicon-based PICs 400 allow for the seamless integration of optical and electronic components and for the integration with active indium phosphide components (while still using silicon substrates), and offer low propagation losses and high confinement as well as a reproducible, large temperature coefficient of refractive index change enabling temperature tuning of wavelength. To couple light between a silicon-nitride-based grating coupler (implementing input/output coupler 402) and the largely silicon-based remainder of the PIC 400, the two incoming waveguides 406, 408, which are made of silicon-nitride like the input/output coupler 402, are coupled to two respective silicon waveguides 410, 412 via mode converters 300. The silicon waveguides 410, 412 may be rib waveguides 306, which may each taper down in the region of the respective mode converter 300, coupling light into the wire waveguide 302 formed underneath, from which the light is then coupled up into the top waveguide 304.

In the tapered region of the wire waveguide 302, smooth sidewalls, as described herein (e.g., with respect to FIG. 1B), prevent the high levels of return losses (due to scattering) that might otherwise result from high surface roughness in conjunction with confinement of the optical mode in a small cross-sectional area. With an input/output coupler 402 operated as an output coupler, such return losses would not only reduce the amount of light coupled into the silicon-nitride waveguide and, thus, ultimately transmitted by the output coupler 402, but backscattered light could also interfere with the operation of other devices in the PIC 400, particularly lasers or other devices containing active media, where the backscattered light would be amplified. Accordingly, wire waveguides 302 with sidewalls that are atomically smooth (by virtue of coinciding with crystallographic planes) can provide significant performance improvements.

Power coupling between the forward and backward propagating optical modes in a waveguide is generally proportional to the surface variance (i.e., standard deviation squared) (see, e.g., F. Ladouceur and L. Poladian, "Surface roughness and backscattering," Optics Letters, Vol. 21 No. 22, Nov. 15 (1996)). Further, the smaller the diameter of an optical mode, the more sensitive is the optical mode to surface roughness. In optical mode converters in accordance with various embodiments, where the mode diameter along the waveguide taper may become as small as, e.g., 250 nm, the surface roughness resulting from conventional manufacturing processes tends to cause problematically high return losses. Sidewall smoothing of wire waveguides in accordance herewith can reduce the return losses by about 10 dB in some embodiments. In one embodiment, a mode converter with a wire waveguide having smoothened sidewalls has an overall return loss, accounting for both backscattering along the walls and reflection at the tip of the taper, of less than −30 dB across the operating wavelength range from 1260 nm to 1360 nm. In some embodiments, wire waveguide with widths of less than 0.5 μm (as may be useful to achieve strong mode confinement) can, as a result of sidewall smoothing in accordance herewith, achieve return losses per unit length of waveguide of less than −40 dB/mm.

Figure 5:
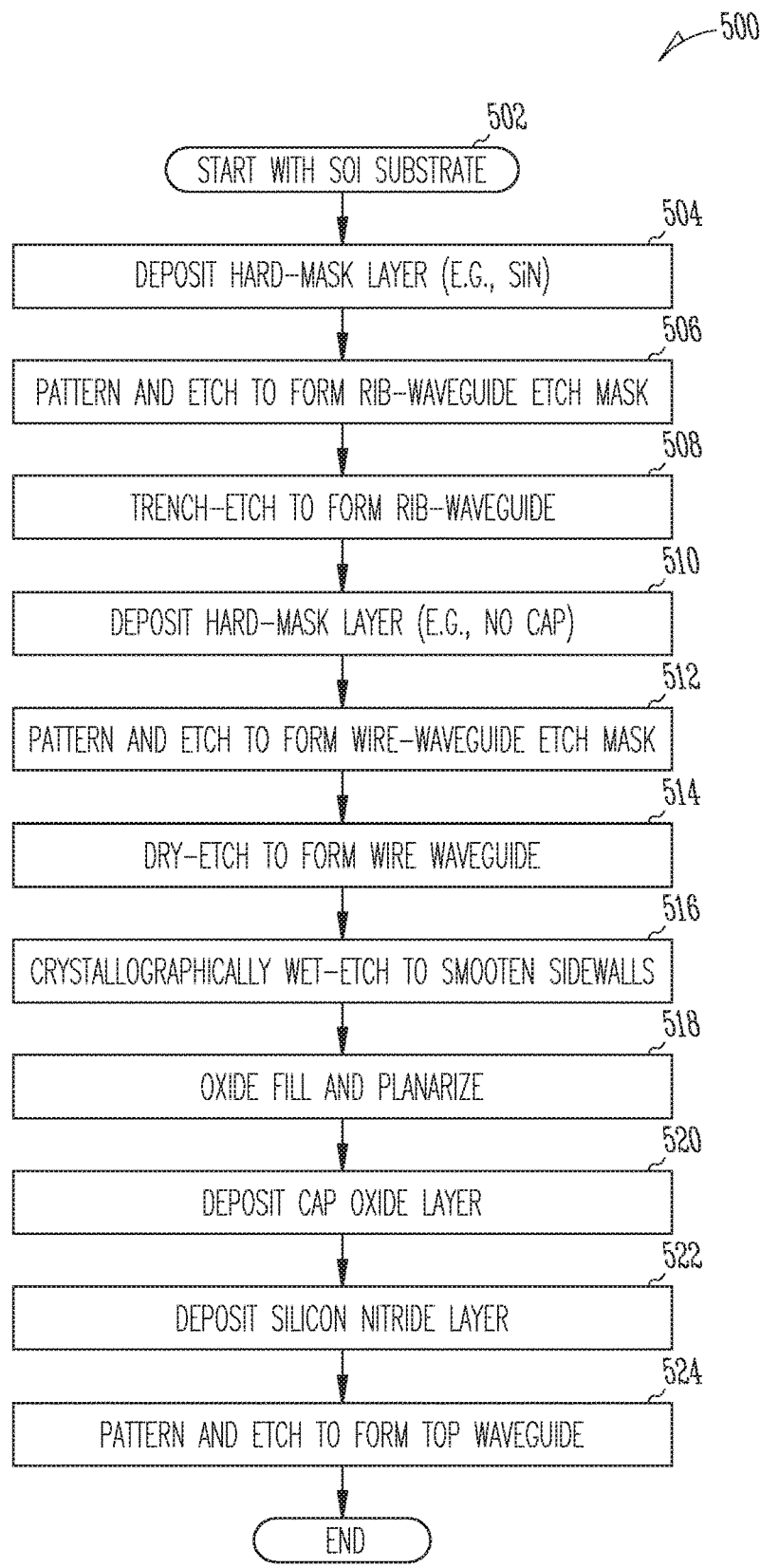
FIG. 5 is a flow chart of a method of manufacturing a mode converter including a wire waveguide in accordance with various embodiments.

Referring now to the flow chart of FIG. 5 in conjunction with the cross-sectional views of FIGS. 6A-6M, a method 500 of manufacturing a mode converter 300 including a wire waveguide 100, 302 with smooth sidewalls and a minimum width not exceeding the defined width of the waveguide will be described. FIGS. 6B-6M illustrate the optical structure resulting at various stages of the manufacturing process, each showing different cross sections along the waveguide axis 308 that correspond to the final structures of FIGS. 3C, 3D, 3G, and 3H. For the sake of specificity, the discussion will focus on a silicon/silicon-nitride mode converter 300. A person of skill in the art will know, however, how to implement the method 500 for other material combinations. Further, although the creation of a wire waveguide 100, 302 in accordance herewith will be described in the context of manufacturing a mode converter 300, it will be readily apparent to those of ordinary skill in the art how to modify the method 500 (e.g., by omitting some steps and/or adding others) to implement a wire waveguide 100 in conjunction with or as part of integrated optical structures other than mode converters 300.

Figure 6A:
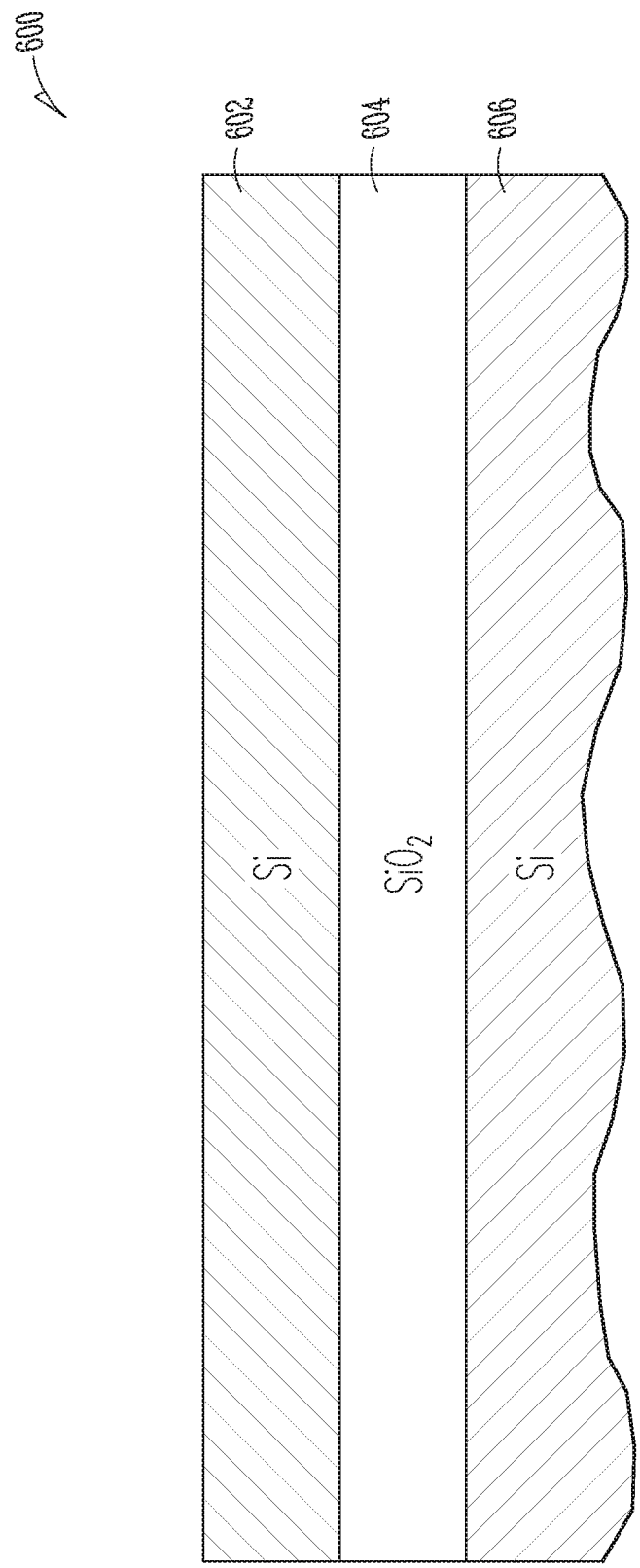
Figure 6C:
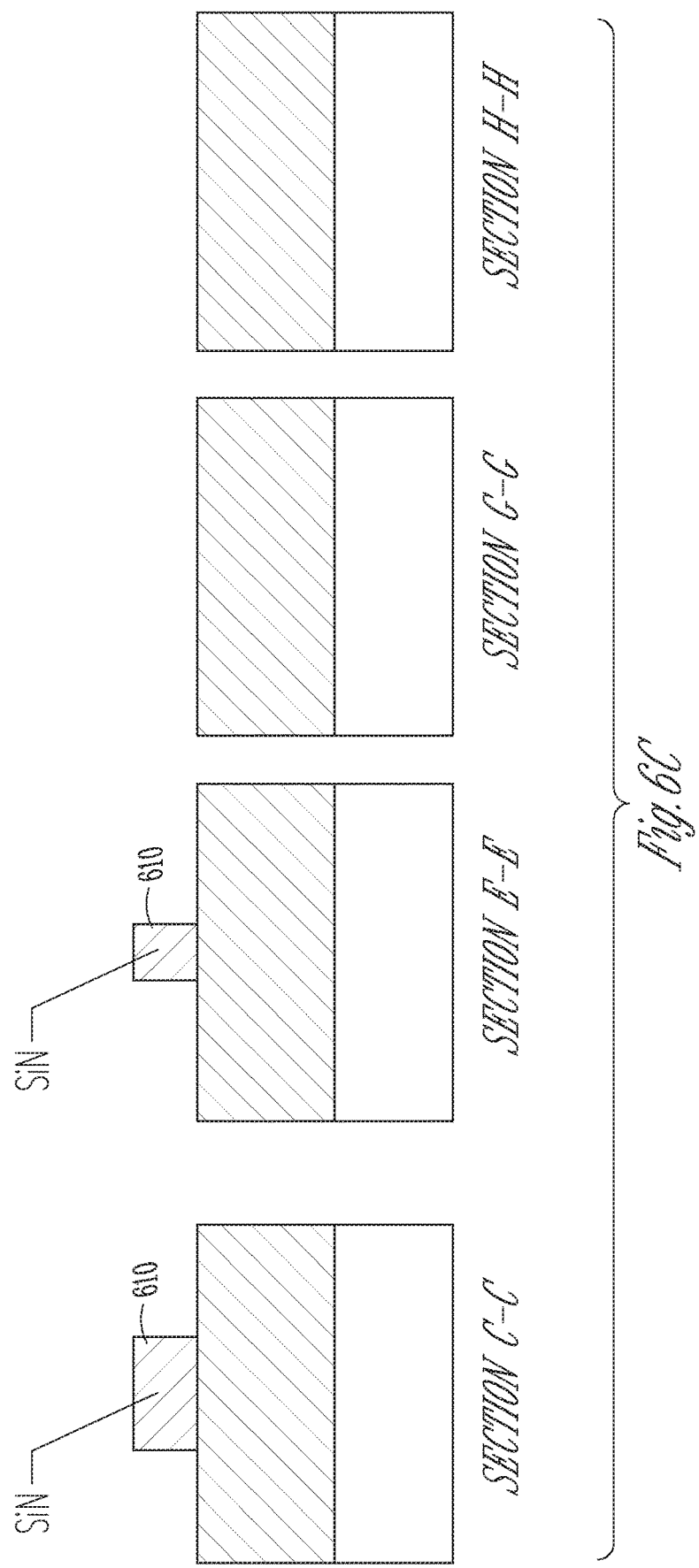
Figure 6J:
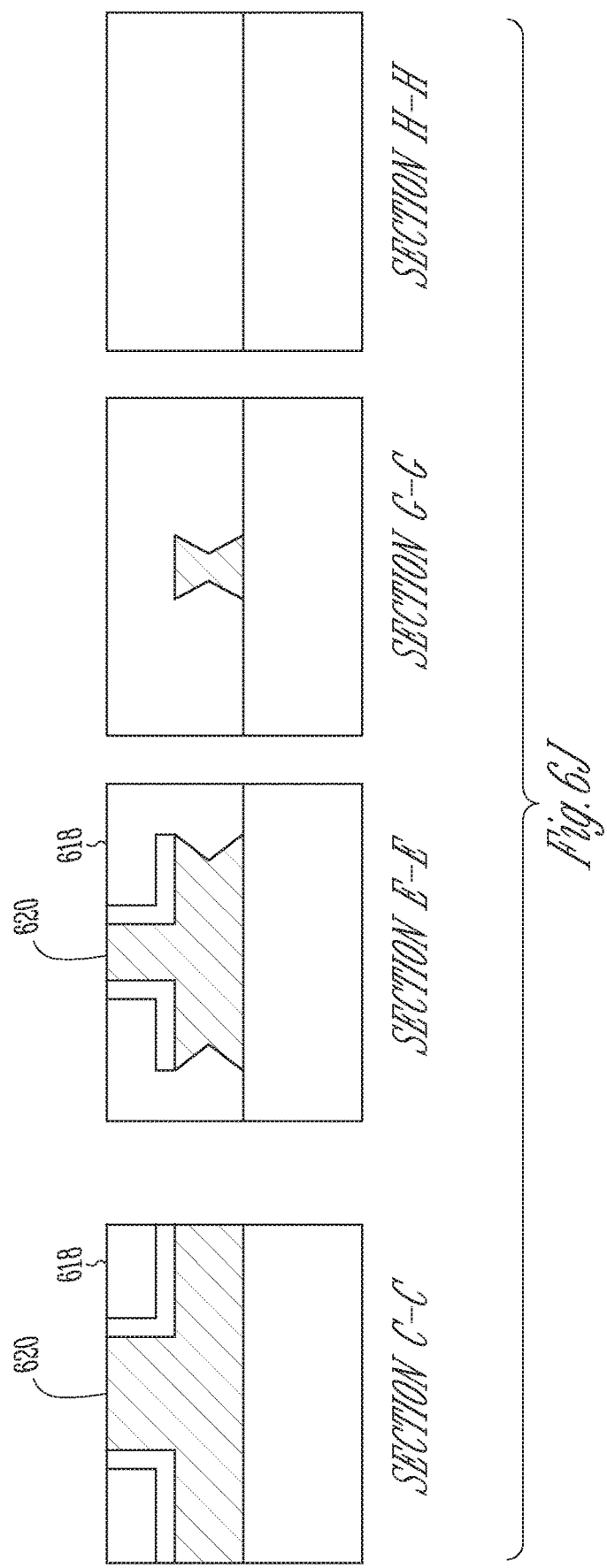

The starting point 502 of the method 500 is an SOI substrate 600 (shown in FIG. 6A). In some embodiments, the silicon device layer 602 of the substrate 600 is 500 nm thick and is disposed on top of a silicon dioxide layer 604 that is between about 1000 nm and 1200 nm thick. The much thicker silicon handle 606 (having a thickness of, e.g., about 0.725 mm) is only partially shown, and is omitted from FIGS. 6B-6M. To create a rib waveguide 306 in the silicon device layer 602, a hard-mask layer 608 of, e.g., silicon nitride, is deposited on top of the silicon device layer 602 shown in FIG. 6B (act 504), and patterned photolithographically and etched (e.g., in manners known in the art) to form a rib-waveguide etch mask 610 as shown in FIG. 6C (act 506). A rib trench etch may then be used to partially etch the silicon device layer 602 to thereby form the rib waveguide 306 as shown in FIG. 6D (act 508).

Following creation of the rib waveguide 306, a silicon dioxide cap layer 612 (shown in FIG. 6E), or other material layer, may be deposited (act 510) and photolithographically patterned and etched (act 512) to form a wire-waveguide etch mask 614 as shown in FIG. 6F. The masked semiconductor device layer 602 (now already including the rib waveguide 306) can then be dry-etched (e.g., in a manner known in the art) down to the silicon oxide layer 604 to form a wire waveguide 616 with exposed sidewalls as shown in FIG. 6G (act 514). The sidewalls are initially straight vertical walls. During the following crystallographic wet etch (act 516), however, a triangular undercut is created and the sidewalls are simultaneously smoothened, resulting in the hourglass-shaped wire waveguide 302 described above and shown in FIG. 6H. For the wet etch, an anisotropic etchant such as, for example, tetramethyl ammonium hydroxide (TMAH) is used. This etchant etches preferably along the <100> family of crystal directions, with a selectivity (that is, ratio of the etch rate in the <100> directions relative to that in the <111> directions) of more than 100:1. Alternative etchants may have an etch-rate ratio of at least 50:1, and include, for example ammonium hydroxide, and potassium hydroxide. In general, the choice of etchant depends, at least in part, on the semiconductor material to be etched. If the semiconductor device layer and wire waveguide 302 are made, for instance, of a compound semiconductor rather than silicon, hydrochloride may be a more suitable anisotropic etchant. In any case, in accordance herewith, the crystallographic wet etch is pinned between the wire-waveguide mask 614 and the silicon-dioxide insulator layer 604, which are both chemically resistant to the etchant. The wire-waveguide mask 614 protects the top surface 106 of the wire waveguide 302 and, as a consequence, the wire waveguide 302 is not etched down to a trapezoid cross-sectional shape, but retains its height and assumes a shape symmetric about a medial plane 126 (as described in detail with reference to FIG. 1B).

Following the creation of the wire waveguide 302 and smoothening of its sidewalls, the PIC may be planarized with a dielectric (e.g., oxide, a polymer, or generally any dielectric material having a refractive index lower than the top waveguide 304) fill (shown in FIG. 6I) followed by removal (e.g., by chemical mechanical polishing) of the fill dielectric 618 down to the top surface 620 of the rib waveguide 306 (shown in FIG. 6J) (act 518). A cap oxide layer 622 (shown in FIG. 6K) may then be deposited (act 520). Finally, to form the silicon-nitride top waveguide 304 completing the mode converter 300, a silicon nitride layer 624 (shown in FIG. 6L) is deposited on top of the cap oxide layer 622 (act 522) and then patterned and etched to leave only the top waveguide 304 (shown in FIG. 6M) (act 524).

While the mode converter 300 depicted in FIGS. 3A-3H has the lower-index (e.g., silicon-nitride) waveguide disposed above the wire waveguide 302 as a top waveguide 304, it is also possible, in alternative embodiments, to dispose the higher-index (e.g., silicon) wire waveguide above a second, lower-index waveguide. For example, a silicon-nitride waveguide may be embedded in a silicon-oxide layer, and a silicon wire waveguide may be created in a silicon device layer disposed on top of that silicon-oxide layer. The embedded silicon-nitride waveguide may be created by forming a silicon oxide layer on a silicon substrate, depositing a silicon nitride layer on top of the silicon oxide layer, and then filling with another layer of silicon oxide. To the resulting top silicon-oxide layer, an SOI substrate may then be bonded top-side down, and the silicon handle and insulator layers of the SOI substrate may subsequently be removed to expose the silicon device layer. The resulting silicon-on-oxide-on-silicon substrate with embedded silicon-nitride waveguide may then be further processed in accordance with acts 504-516 (and, optionally, 518, 520) of method 500 to create the silicon wire waveguide with smooth sidewalls. As yet another variation, in some embodiments, the lower-index waveguide may encapsulate the higher-index wire waveguide so that the waveguides touch at the top and side surfaces of the higher-index waveguide. Smoothened wire waveguides may also find use in mode converters for edge coupling, where the oxide below the silicon wire waveguide is etched away, leaving a suspended wire taper, which is highly sensitive to surface roughness. Further structural variations that still utilize the principles discussed above to create wire waveguides with smooth sidewalls may occur to those of ordinary skill in the art.

Although embodiments have been described with reference to specific example embodiments, it will be evident that various modifications and changes may be made to these embodiments without departing from the broader scope of the disclosure. Accordingly, the specification and drawings are to be regarded in an illustrative rather than a restrictive sense.

What is claimed is:

1. An integrated optical structure comprising:
   a semiconductor-on-insulator substrate comprising a semiconductor device layer;
   a wire waveguide formed in the semiconductor device layer, the wire waveguide having a top surface and sidewalls and comprising a tapered region decreasing in width towards a narrow end; and
   a second waveguide disposed above or below the tapered region of the wire waveguide at the narrow end, the second waveguide made from a different material than the wire waveguide, and the second waveguide and wire waveguide together forming an optical mode converter,
   wherein the sidewalls, along a length of the wire waveguide in the tapered region, do not extend laterally beyond the top surface of the wire waveguide and substantially consist of sidewall portions coinciding with crystallographic planes of the wire waveguide, and
   wherein, along a portion of the tapered region of the wire waveguide that has a width of less than 0.5 μm, a return loss is less than −40 dB/mm across an operating wavelength range.

2. The integrated optical structure of claim 1, wherein the sidewall portions comprise, along the length of the wire waveguide in the tapered region, one or more substantially planar upper portions extending from a top edge of the wire waveguide at an acute angle with respect to the top surface of the wire waveguide and one or more substantially planar lower portions extending from a bottom edge of the wire waveguide at an acute angle with respect to a bottom surface of the wire waveguide, the upper and lower portions meeting at a medial horizontal plane of the wire waveguide.

3. The integrated optical structure of claim 1, wherein the sidewalls have sub-nanometer surface roughness along the length in the tapered region.

4. The integrated optical structure of claim 1, wherein the substrate is a silicon-on-insulator substrate.

5. The integrated optical structure of claim 1, further comprising a rib waveguide formed in the semiconductor device layer on top of and parallel to the wire waveguide, the rib waveguide being tapered in at least one of width and height in a same direction along a length of the rib waveguide as the wire waveguide.

6. The integrated optical structure of claim 1, wherein a refractive index of a material of the wire waveguide is greater than a refractive index of the material of the second waveguide.

7. The integrated optical structure of claim 6, wherein the wire waveguide is made of silicon and the second waveguide is made of silicon nitride.

8. The integrated optical structure of claim 1, wherein the sidewall portions are atomically smooth.

9. A photonic integrated circuit (PIC) comprising:
an optical mode converter comprising a first waveguide made of a first material and tapered towards one end, and disposed above or below the first waveguide at the tapered end, a second waveguide made of a second material, a refractive index of the first material being greater than a refractive index of the second material, wherein the first waveguide is a wire waveguide having a top surface and sidewalls, and wherein the sidewalls, along at least a portion of a length of the wire waveguide at the tapered end, do not extend laterally beyond the top surface and substantially consist of sidewall portions coinciding with crystallographic planes of the wire waveguide.

10. The PIC of claim 9, wherein the wire waveguide is formed in a silicon device layer of a silicon-on-insulator substrate and the second waveguide is formed in a silicon-nitride layer disposed above the silicon device layer, the PIC further comprising a silicon-nitride grating coupler coupled to the second waveguide and one or more silicon devices coupled to the wire waveguide.

11. The PIC of claim 10, further comprising a rib waveguide formed in the silicon device layer on top of and parallel to the wire waveguide, the rib waveguide being tapered in at least one of width and height in a same direction along a length of the rib waveguide as the wire waveguide.

12. The PIC of claim 9, wherein the sidewall portions comprise, along at least the portion of the length of the wire waveguide, one or more substantially planar upper portions extending from a top edge of the wire waveguide at an acute angle with respect to the top surface of the wire waveguide and one or more substantially planar lower portions extending from a bottom edge of the wire waveguide at an acute angle with respect to a bottom surface of the wire waveguide, the upper and lower portions meeting at a medial horizontal plane of the wire waveguide.

13. The PIC of claim 9, wherein the sidewalls have sub-nanometer surface roughness along at least the portion of the length of the wire waveguide.

* * * * *